(12) United States Patent
Chamberlin et al.

(10) Patent No.: US 8,564,168 B2
(45) Date of Patent: Oct. 22, 2013

(54) ROTOR LAMINATION ASSEMBLY (75) Inventors: Bradley D. Chamberlin, Pendleton, IN (US); Balazs Palfai, Fishers, IN (US)

(73) Assignee: Remy Technologies, L.L.C., Pendleton, IN (US)

(*) Notice: Subject to any disclaimer, the term of this patent is extended or adjusted under 35 U.S.C. 154(b) by 585 days.

(21) Appl. No.: 12/786,098

(22) Filed: May 24, 2010

(65) Prior Publication Data

US 2011/0285241 A1 Nov. 24, 2011

(51) Int. Cl.
*H02K 1/27* (2006.01)

(52) U.S. Cl.
USPC ......... 310/216.017; 310/216.016; 310/156.53

(58) Field of Classification Search
USPC ............. 310/216.015–216.019, 216.011, 310/216.111, 156.53, 156.58
See application file for complete search history.

(56) References Cited

U.S. PATENT DOCUMENTS

| | | | | |
|---|---|---|---|---|
| 4,354,126 A | * | 10/1982 | Yates | 310/156.59 |
| 5,125,575 A | * | 6/1992 | Iwanaga | 239/96 |
| 5,962,944 A | * | 10/1999 | Narita et al. | 310/156.53 |
| 7,279,821 B2 | * | 10/2007 | Fukushima et al. | 310/156.53 |
| 2008/0093944 A1 | | 4/2008 | Takahashi et al. | |
| 2009/0115279 A1 | * | 5/2009 | Spaggiari | 310/156.53 |
| 2010/0301697 A1 | * | 12/2010 | Takahashi et al. | 310/156.53 |

FOREIGN PATENT DOCUMENTS

| | | |
|---|---|---|
| JP | 2006-311730 A | 11/2006 |
| JP | 2009136040 A | 6/2009 |
| JP | 2009284621 A | 12/2009 |

OTHER PUBLICATIONS

Woldman, Woldman'S Engineering Alloys, Dec. 2000, ASM International, 9TH Edition.*
AK Steel, Product Data Bulletin 301 Stainless Steel, 2000.*
AK Steel, Product Data Bulletin Selection of Electrical Steels for Magnetic Cores, 2007.*
International Search Report and Written Opinion for corresponding PCT Application No. PCT/US2011/035602, dated Dec. 23, 2011, pp. 1-11.
International Preliminary Report on Patentability for PCT Application No. PCT/US2011/035602, dated Dec. 6, 2012, pp. 1-8.

* cited by examiner

*Primary Examiner* — Burton Mullins
*Assistant Examiner* — Eric Johnson
(74) *Attorney, Agent, or Firm* — Cantor Colburn LLP (57) ABSTRACT An electric machine includes a rotor lamination assembly having a lamination member formed from a material having a first yield strength. The lamination member includes a first bridge portion having a first width, and a first bridge zone having a first thickness. The rotor lamination assembly also includes at least one lamination section having a second bridge zone having a second thickness. The second thickness is greater than the first thickness. The rotor lamination assembly further includes at least one lamination element formed from a second material having a second yield strength that is higher than the first yield strength, and at least one lamination component. The at least one lamination component includes a second bridge portion having a second width. The second width is greater than the first width.

25 Claims, 5 Drawing Sheets

ROTOR LAMINATION ASSEMBLY

BACKGROUND OF THE INVENTION

The subject matter disclosed herein relates to the art of electric machines and, more particularly, to a rotor lamination assembly for a permanent magnet electric machine.

Electric machines include a rotor that sets up a magnetic field. Electrical current passing though a stator is influenced by the magnetic field creating an electromotive force that causes the rotor to spin. Certain electric motors/generators employ permanent magnets in the rotor. The permanent magnets are mounted in magnet slots formed in the rotor which is typically formed from a plurality of laminations. Generally, the permanent magnets are mounted near an outside edge of the rotor, as close to the outside edge as possible, in order to maximize torque and minimize flux losses. Mounting the permanent magnets in this manner creates a thin bridge area between the magnet slots and the outside edge of the rotor.

During high speed operation, centrifugal forces on the rotor create stress in the thin bridge area. If operated at too high a speed, the stress can exceed the yield strength of the laminations. In such a case, the rotor could fail. Accordingly, there is a trade off between maximizing torque and high speed operation. That is, maximizing torque by mounting the permanent magnets as close to the outside edge of the rotor limits the overall operational speed of the electrical machine.

BRIEF DESCRIPTION OF THE INVENTION

According to one aspect of the invention, an electric machine includes a stator, and a rotor lamination assembly configured and disposed to rotate relative to the stator. The rotor lamination assembly includes at least one lamination member having a body member formed from a material having a first yield strength. The body member includes an outer diametric edge, a first magnet receiving member and a second magnet receiving member. Each of the first and second magnet receiving members includes a first end that extends to a second end. The second end of each of the first and second magnet receiving members is spaced from the outer diametric edge to form a first bridge portion having a first width, and the first end of the first magnet receiving member is spaced from the first end of the second magnet receiving member by a first bridge zone having a first thickness. The rotor lamination assembly also includes at least one lamination section including a body section having a first magnet receiving section and a second magnet receiving section. Each of the first and second magnet receiving sections includes a first end section that extends to a second end section, the first end section of the first magnet receiving section is spaced from the first end section of the second magnet receiving section by a second bridge zone having a second thickness. The second thickness is greater than the first thickness. The rotor lamination assembly further includes at least one lamination element including a body element formed from a second material having a second yield strength that is higher than the first yield strength, and at least one lamination component. The at least one lamination component includes a body component having an outer diametric edge, and at least one magnet receiving component. The at least one magnet receiving component including a first end portion that extends to a second end portion. The second end portion is spaced from the outer diametric edge to form a second bridge portion having a second width. The second width is greater than the first width.

According to another aspect of the invention, an electric machine includes a stator, and a rotor lamination assembly configured and disposed to rotate relative to the stator. The rotor lamination assembly includes at least one lamination member having a body member formed from a material having a first yield strength. The body member includes an outer diametric edge, a first magnet receiving member and a second magnet receiving member. The rotor lamination assembly also includes at least one lamination element. The at least one lamination element includes a body element formed from a second material having a second yield strength that is higher than the first yield strength.

According to yet another aspect of the invention, an electric machine includes a stator, and a rotor lamination assembly configured and disposed to rotate relative to the stator. The rotor lamination assembly includes at least one lamination member. The at least one lamination member includes a body member having an outer diametric edge, a first magnet receiving member and a second magnet receiving member. Each of the first and second magnet receiving members includes a first end that extends to a second end. The second end of at least one of the first and second magnet receiving members is spaced from the outer diametric edge to form a first bridge portion having a first width. The rotor lamination assembly also includes at least one lamination component. The at least one lamination component includes a body component having an outer diametric edge, and at least one magnet receiving component. The at least one magnet receiving component includes a first end portion that extends to a second end portion. The second end portion is spaced from the outer diametric edge to form a second bridge portion having a second width. The second width is greater than the first width.

According to yet another exemplary embodiment, an electric machine includes a stator, and a rotor lamination assembly configured and disposed to rotate relative to the stator. The rotor lamination assembly includes at least one lamination member having a body member formed from a material having a first yield strength. The body member includes an outer diametric edge, a first magnet receiving member and a second magnet receiving member. Each of the first and second magnet receiving members includes a first end that extends to a second end. The first end of the first magnet receiving member is spaced from the first end of the second magnet receiving member by a first bridge zone having a first thickness. The rotor lamination assembly also includes at least one lamination section having a body section provided with a first magnet receiving section and a second magnet receiving section. Each of the first and second magnet receiving sections includes a first end section that extends to a second end section. The first end section of the first magnet receiving section is spaced from the first end section of the second magnet receiving section by a second bridge zone having a second thickness. The second thickness is greater than the first thickness.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
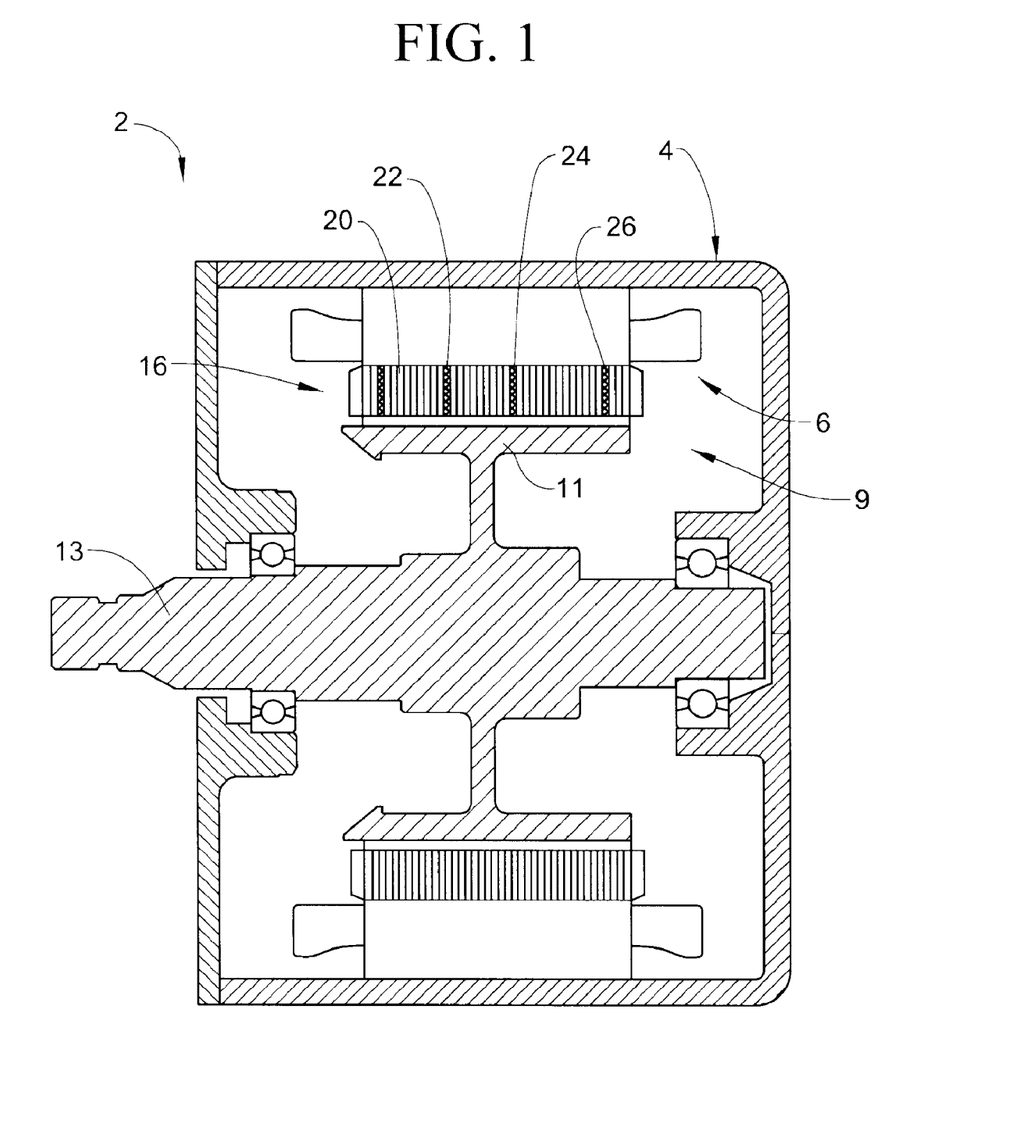
FIG. 1 is a cross-sectional side view of an electric machine including a rotor lamination assembly constructed in accordance with an exemplary embodiment.

Referring to FIG. 1, an electric machine constructed in accordance with an exemplary embodiment is indicated generally at 2. Electric machine 2 includes a housing 4 having mounted thereto a stator 6. A rotor 9 rotates relative to stator 6 to produce an electro-motive force. In the exemplary embodiment shown, rotor 9 includes a hub portion 11 mounted to a shaft 13. Rotor 9 includes a rotor lamination assembly 16 formed from a plurality of lamination members, one of which is indicated at 20, lamination components, one of which is indicated at 22, lamination elements, one of which is indicated at 24, and lamination sections one of which is indicated at 26. Lamination members 20, lamination components 22, lamination elements 24 and/or lamination sections 26 are adhesively joined one to another to form rotor lamination assembly 16.

Figure 2:
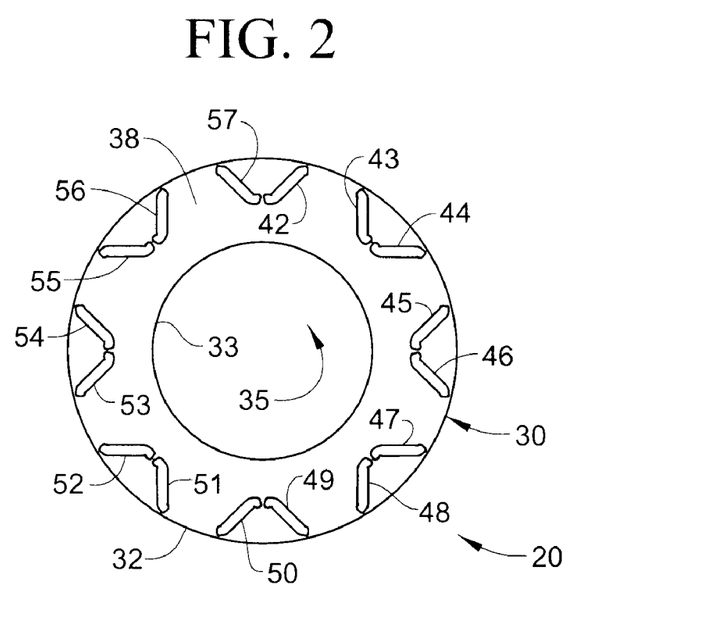
FIG. 2 is a plan view of a lamination member of the rotor lamination assembly of FIG. 1.

Reference will now be made to FIG. 2 in describing lamination member 20 in accordance with an exemplary embodiment. Lamination member 20 includes a body member 30 having an outer diametric edge 32, and an inner diametric edge 33 that defines a rotor hub receiving portion 35. Outer diametric edge 32 is spaced from inner diametric edge 33 by a web portion 38. Body member 30 is formed from a material having a first yield strength. More specifically, body member 30 is formed from a material having a yield strength between about 300 MPa and about 350 MPa. For example, body member 30 is formed from M15 lamination steel. As shown, lamination member 20 includes a plurality of magnet receiving members 42-57 that locate a corresponding plurality of magnets (not shown) within rotor lamination assembly 16. As each magnet receiving member 42-57 includes similar structure, reference will now follow to FIG. 3 in describing magnet receiving members 42 and 57 with an understanding that the remaining magnet receiving members 43-56 are similarly formed.

Figure 3:
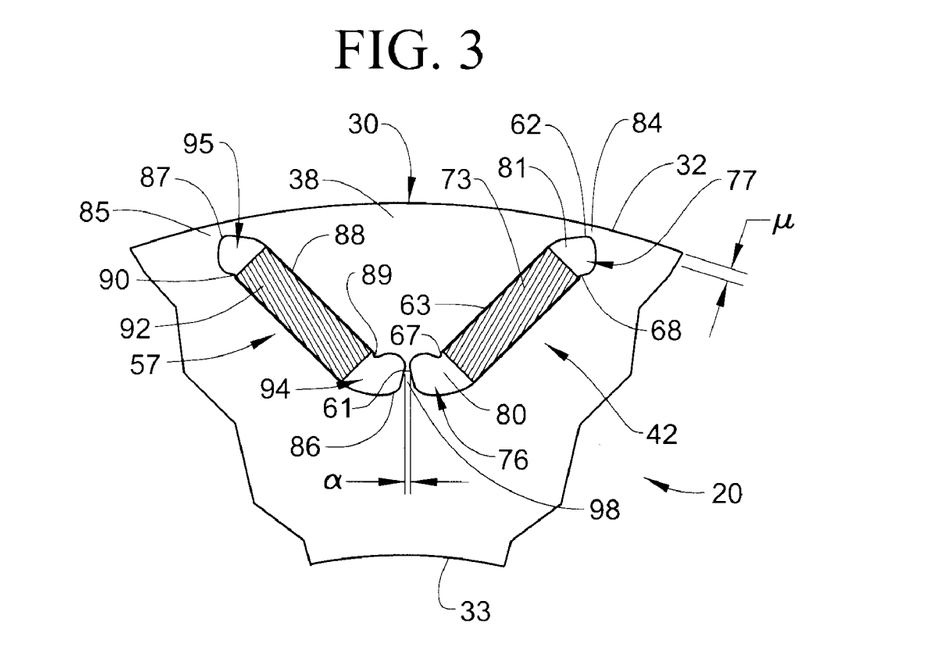
FIG. 3 is a detail view of a magnet receiving member of the lamination member of FIG. 2.

Magnet receiving member 42 includes a first end 61 that extends to a second end 62 through an intermediate portion 63. A first magnet retaining member 67 is arranged proximate to first end 61 and a second magnet retaining member 68 is arranged proximate to second end 62. First and second magnet retaining members 67 and 68 locate and retain a magnet 73 within magnet receiving member 42. A first void 76 is established between magnet 73 and first end 61, and a second void 77 is formed between second end 62 and magnet 73. First and second voids 76 and 77 are provided with a corresponding filler material 80 and 81. Filler material 80 and 81 typically takes the form of injected plastic that not only holds magnet 73 in place but also prevents oil from penetrating into lamination assembly 16.

In the exemplary embodiment shown, second end 62 of magnet receiving member 42 is spaced from outer diametric edge 32 establishing a bridge portion 84 having a width μ. In accordance with one aspect of the exemplary embodiment, width μ is between about 1.5 mm and about 2.5 mm. During high speed operation, cracks can develop in bridge portion 84 due to stress concentrations created by centrifugal forces acting upon rotor lamination assembly 16. In order to mitigate the cracking, rotor lamination assembly 16 also includes one or more of rotor lamination components 22 and/or lamination elements 24 as will be described more fully below.

Similarly, magnet receiving member 57 includes a first end 86 that extends to a second end 87 through an intermediate portion 88. A first magnet retaining member 89 is arranged proximate to first end 86 and a second magnet retaining member 90 is arranged proximate to second end 87. First and second magnet retaining members 89 and 90 locate and retain a magnet 92 within magnet receiving member 57. A first void 94 is established between magnet 92 and first end 86, and a second void 95 is formed between second end 87 and magnet 92. First and second voids 94 and 95 are provided with a corresponding filler material (not separately labeled). In a manner similar to that described above, the filler material typically takes the form of injected plastic that not only holds magnet 92 in place but also prevents oil from penetrating into lamination assembly 16. In a manner similar to that described above, second end 87 of magnet receiving member 57 is spaced from outer diametric edge 32 establishing a bridge portion 85 having the width μ.

In the exemplary embodiment shown, first end 61 of magnet receiving member 42 is spaced from first end 86 of magnet receiving member 57 by a bridge zone 98. In the embodiment shown, bridge zone 98 includes a thickness α. In accordance with one aspect of the exemplary embodiment, thickness α is between about 1 mm and about 2 mm. In a manner similar to that described above with respect to bridge portion 84, during high speed operation, cracks can develop in bridge zone 98 due to stress concentrations created by centrifugal forces acting upon rotor lamination assembly 16. In order to mitigate the cracking, one or more of rotor lamination components 22 and/or lamination elements 24 are configured to sustain higher stress concentrations as will be described more fully below.

Figure 4:
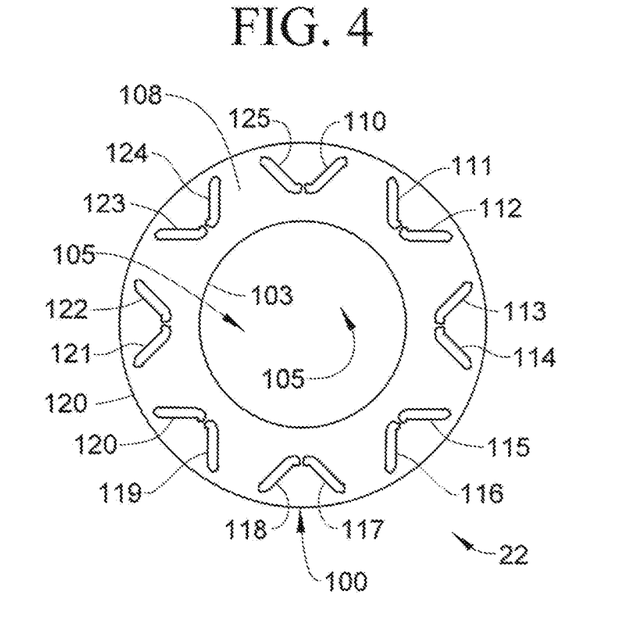
FIG. 4 is a plan view of a rotor lamination component of the rotor lamination assembly of FIG. 1.

As best shown in FIG. 4, lamination component 22 includes a body component 100 having an outer diametric edge 102, and an inner diametric edge 103 that defines a rotor hub receiving portion 105. Outer diametric edge 102 is spaced from inner diametric edge 103 by a web portion 108. Body component 100 is formed from a material having one of the first yield strength and a second yield strength. More specifically, body component 100 is formed either from the same material as body member 30 or from a different material having higher yield strength of between about 400 MPa and about 450 MPa. In accordance with one aspect of the exemplary embodiment, body component 100 is formed from one of a non-magnetic material such as stainless steel, glass fiber, and ceramic, and a magnetic material such as high carbon steel.

As shown, lamination component 22 includes a plurality of magnet receiving components 110-125 that are arrayed about outer diametric edge 102 and which locate the plurality of magnets (not shown in FIG. 4) within rotor lamination assembly 16. As each magnet receiving component 110-125 includes similar structure, reference will now follow to FIG.

Figure 5:
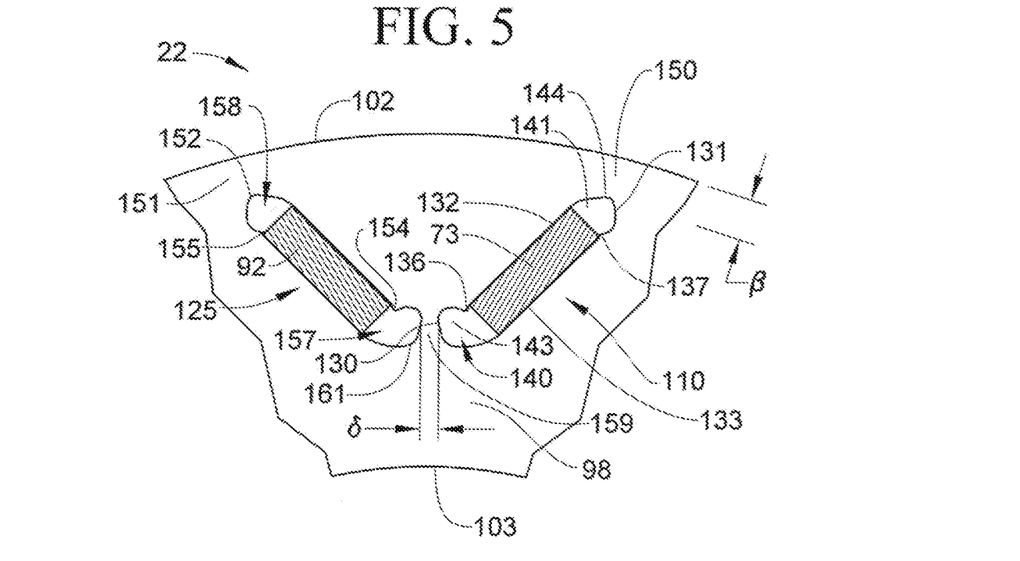
FIG. 5 is a detail view of a magnet receiving component of the lamination component of FIG. 4.

5 in describing magnet receiving components 110 and 125 with an understanding that the remaining magnet receiving components 111-124 are similarly formed.

Magnet receiving component 110 includes a first end portion 130 that extends to a second end portion 131 through an intermediate portion 132. A first magnet retaining component 136 is arranged proximate to first end portion 130 and a second magnet component 137 is arranged proximate to second end portion 131. First and second magnet retaining components 136 and 137 register with first and second magnet retaining members 67 and 68 to locate and retain magnet 73 within magnet receiving component 110. In a manner similar to that described above, a first void 140 is established between magnet 73 and first end portion 130, and a second void 141 is formed between second end portion 131 and magnet 73. First and second voids 140 and 141 are provided with a corresponding filler material 143 and 144. As also noted above, filler material 143 and 144 typically takes the form of injected plastic that holds magnet 73 in place.

In the exemplary embodiment shown, second end portion 131 of magnet receiving component 110 is spaced from outer diametric edge 92 establishing a bridge portion 150 having a width β. In accordance with one aspect of the exemplary embodiment, width β is between about 4.0 mm and about 4.5 mm. Moreover, bridge portion 150 is larger than bridge portion 84. While width β may increase magnetic flux at outer diametric edge 92, any losses are off-set by the increased operational envelope. That is, with this arrangement lamination component 22 provides support to adjacent lamination members 20 thereby facilitating high speed operation while supporting adjacent bridge portion(s) 84 to prevent failure.

Similarly, Magnet receiving component 125 includes a first end portion 151 that extends to a second end portion 152 through an intermediate portion 153. A first magnet retaining component 154 is arranged proximate to first end portion 151 and a second magnet component 155 is arranged proximate to second end portion 152. First and second magnet retaining components 154 and 155 register with first and second magnet retaining members 89 and 90 to locate and retain magnet 92 within magnet receiving component 125. In a manner similar to that described above, a first void 157 is established between magnet 92 and first end portion 151, and a second void 158 is formed between second end portion 152 and magnet 92. First and second voids 157 and 158 are provided with a corresponding filler material (not separately labeled). As also noted above, the filler material typically takes the form of injected plastic that holds magnet 92 in place. In a manner similar to that described above, second end portion 152 of magnet receiving component 125 is spaced from outer diametric edge 92 establishing a bridge portion 151 having the thickness β.

In the exemplary embodiment shown, first end portion 130 of magnet receiving member 110 is spaced from first end portion 151 of magnet receiving member 125 by a bridge zone 159. In the embodiment shown, bridge zone 159 includes a thickness δ. In accordance with one aspect of the exemplary embodiment, thickness δ is between about 3 mm and about 8 mm. In accordance with another aspect of the exemplary embodiment, thickness δ is between about 4 mm and about 6 mm. In accordance with yet another aspect of the exemplary embodiment, thickness δ is about 5.5 mm. Moreover, bridge zone 159 is larger than bridge zone 98. With this arrangement, lamination component 22 provides support to adjacent lamination members 20 thereby facilitating high speed operation while supporting adjacent bridge zone(s) 98 to prevent failure. Of course, it should be understood that not every lamination component need include a larger bridge portion 150 and bridge zone 159. Various ones of lamination components may include one, the other, or both depending upon desired operating parameters for electric machine 2.

Figure 6:
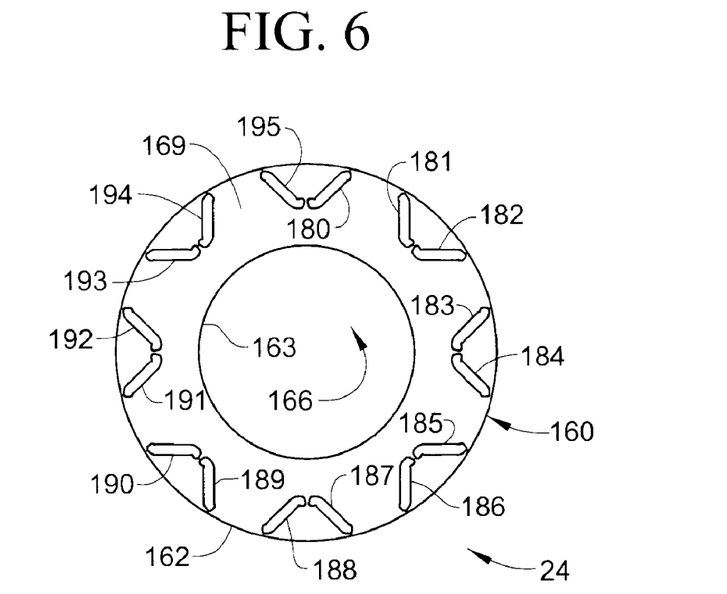
FIG. 6 is a plan view of a rotor lamination element of the rotor lamination assembly of FIG. 1.

In addition, or as an alternative to lamination component(s) 22, rotor lamination assembly 16 also includes one or more lamination elements 24. As best shown in FIG. 6, lamination element 24 includes a body element 160 having an outer diametric edge 162, and an inner diametric edge 163 that defines a rotor hub receiving portion 166. Outer diametric edge 162 is spaced from inner diametric edge 163 by a web portion 169. Body element 160 is formed from a material having the second yield strength. More specifically, body component 90 is formed a material having a yield strength that is higher than the first yield strength. In accordance with one aspect of the exemplary embodiment, body component 90 is formed from a material having a yield strength between about 400 MPa and about 450 MPa. That is, the second yield strength is about 30% higher than the first yield strength. In accordance with one aspect of the exemplary embodiment, body element 160 is formed from one of a non-magnetic material such as stainless steel, glass fiber, and ceramic and a magnetic material such as high carbon steel.

As shown, lamination element 24 includes a plurality of magnet receiving elements 180-195 arrayed about outer diametric edge 162 and which position the plurality of magnets (not shown in FIG. 6) within rotor lamination assembly 16. As each magnet receiving element 180-195 includes similar structure, reference will now follow to FIG. 7 in describing magnet receiving elements 180 and 195 with an understanding that the remaining magnet receiving elements 181-194 are similarly formed. Magnet receiving element 180 includes a first end 204 that extends to a second end 205 through an intermediate portion 206. A first magnet retaining element 210 is arranged proximate to first end 204 and a second magnet retaining element 211 is arranged proximate to second end 205. First and second magnet retaining elements 210 and 211 register with first and second magnet retaining members 67 and 68 to locate and retain magnet 73.

Figure 7:
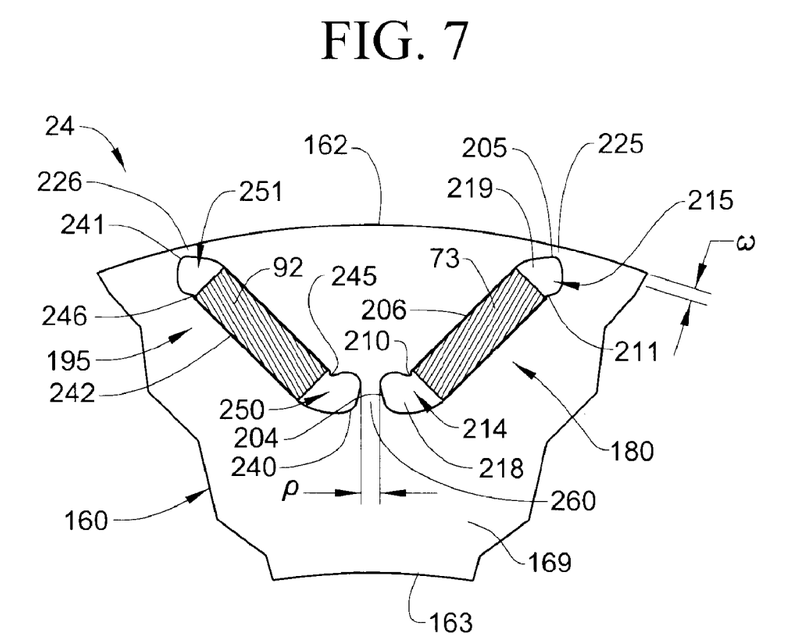
FIG. 7 is a detail view of a magnet receiving element of the lamination element of FIG. 6.

In a manner similar to that described above, a first void 214 is established between magnet 73 and first end 204, and a second void 215 is formed between second end 205 and magnet 73. First and second voids 214 and 215 are provided with a corresponding filler material 218 and 219. Filler material 218 and 219 typically takes the form of injected plastic that not only holds magnet 73 in place, but also prevents oil from penetrating into lamination assembly 16. In the exemplary embodiment shown, second end 205 of magnet receiving element 180 is spaced from outer diametric edge 162 establishing a bridge portion 225 having a width ω. In accordance with one aspect of the exemplary embodiment, width ω is substantially equal to width μ and is between about 1.5 mm and about 2.5 mm.

Similarly, magnet receiving element 195 includes a first end 240 that extends to a second end 241 through an intermediate portion 242. A first magnet retaining element 245 is arranged proximate to first end 240 and a second magnet retaining element 246 is arranged proximate to second end 241. First and second magnet retaining elements 245 and 246 register with first and second magnet retaining members 89 and 90 to locate and retain magnet 92 within magnet receiving component 195. In a manner similar to that described above, a first void 250 is established between magnet 92 and first end 240 and a second void 251 is formed between second end 241 and magnet 92. First and second voids 250 and 251 are provided with a corresponding filler material (not separately labeled). As also noted above, the filler material typically takes the form of injected plastic that holds magnet 92 in place. In the exemplary embodiment shown, second end 241 of magnet receiving element 195 is spaced from outer diametric edge 162 establishing a bridge portion 226 having a thickness ω. In accordance with one aspect of the exemplary embodiment, thickness ω is substantially equal to thickness μ and is between about 1.5 mm and about 2.5 mm.

In the exemplary embodiment shown, first end 204 of magnet receiving element 180 is spaced from first end 240 of magnet receiving element 195 by a bridge zone 260. In the embodiment shown, bridge zone 260 includes a thickness ρ. In accordance with one aspect of the exemplary embodiment, thickness ρ is between about 3 mm and about 8 mm. In accordance with another aspect of the exemplary embodiment, thickness ρ is between about 4 mm and about 6 mm. In accordance with yet another aspect of the exemplary embodiment, thickness ρ is about 5.5 mm. In a manner similar to that described above, bridge zone 260 is larger than bridge zone 98. In accordance with one aspect of the exemplary embodiment, bridge zone 260 is substantially identical to bridge zone 159. In accordance with another aspect of the exemplary embodiment, bridge zone 260 is distinct, either larger or smaller than bridge zone 159. Bridge zone 159 and bridge zone 260 are larger than bridge zone 98.

With this arrangement, lamination element 24 provides support for lamination member(s) 20 to facilitate high speed operation of electric machine 2 with concern for failure of bridge portion(s) 84. That is, by forming lamination element 24 from a material having a higher yield strength, bridge portion 225 is capable of sustaining higher stresses created by high speed operation. Moreover, lamination element 24 provides support to adjacent lamination member(s) 20, lamination component(s) 22, and/or lamination section(s) 26 allowing electric machine 2 to operate at an expanded operational speed envelope. In addition, the inclusion of bridge zone 260, having a thickness that is larger than bridge zone 98, enables lamination element 24 to further support adjacent lamination member(s) 20, lamination component(s) 22, and/or lamination section(s) 26 thereby further facilitating high speed operation. Of course, it should be understood that not every lamination element 24 need include a bridge zone 260 that is larger than bridge zone 98.

Figure 8:
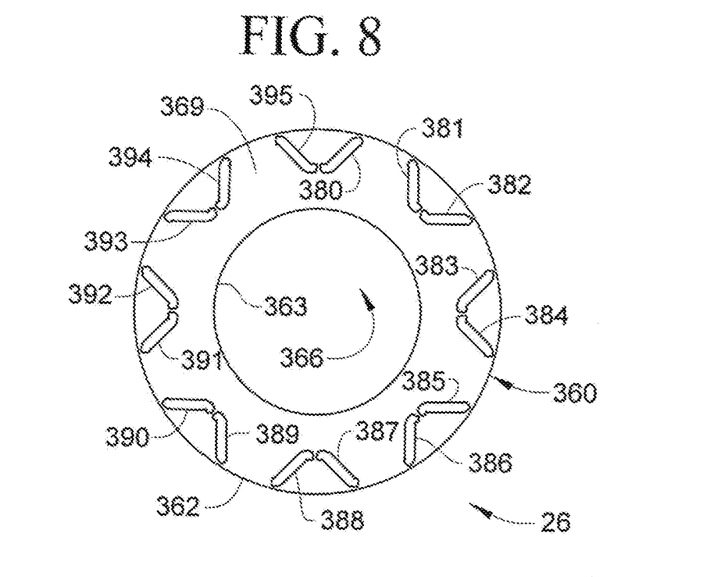
FIG. 8 is a plan view of a rotor lamination section in accordance with an exemplary embodiment.

In addition, or as an alternative to lamination component(s) 22, and lamination element(s) 24 rotor lamination assembly 16 also may include one or more lamination sections 26. As best shown in FIG. 8, lamination section 26 includes a body section 360 having an outer diametric edge 362, and an inner diametric edge 363 that defines a rotor hub receiving portion 366. Outer diametric edge 362 is spaced from inner diametric edge 363 by a web portion 369. In accordance with an exemplary embodiment, body section 360 is formed from a material having the first yield strength.

As shown, lamination section 26 includes a plurality of magnet receiving sections 380-395 arrayed about outer diametric edge 362 and which position the plurality of magnets (not shown in FIG. 8) within rotor lamination assembly 16. As each magnet receiving section 380-395 includes similar structure, reference will now follow to FIG. 9 in describing magnet receiving sections 380 and 395 with an understanding that the remaining magnet receiving sections 381-394 are similarly formed.

Figure 9:
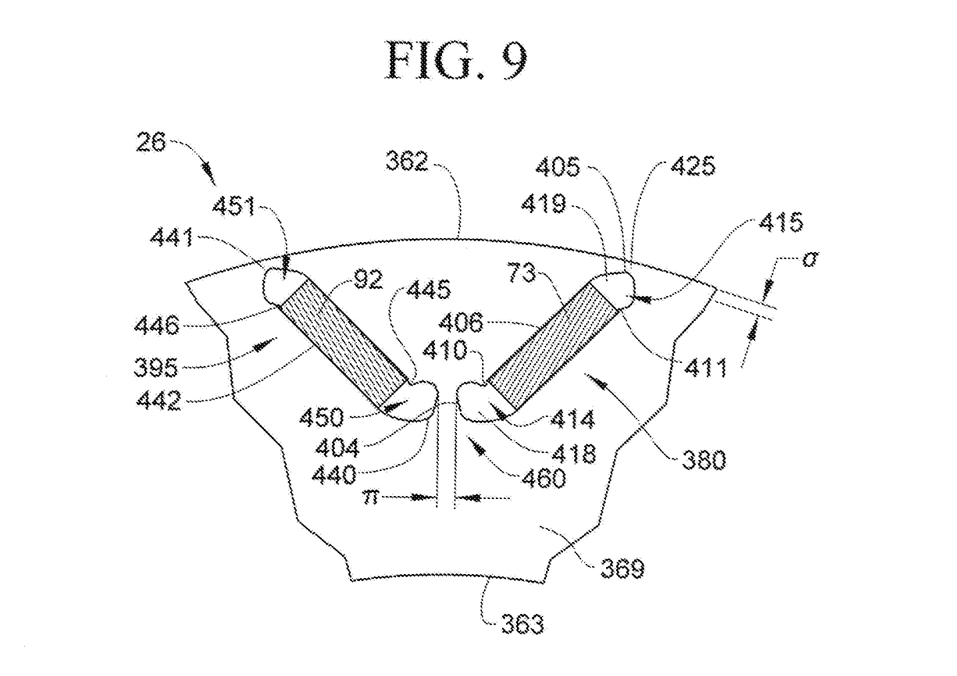
FIG. 9 is a detail view of a pair of magnet receiving sections of the lamination section of FIG. 8.

Magnet receiving section 380 includes a first end section 404 that extends to a second end section 405 through an intermediate section 406. A first magnet retaining section 410 is arranged proximate to first end section 404 and a second magnet retaining section 411 is arranged proximate to second end section 405. First and second magnet retaining sections 410 and 411 register with first and second magnet retaining members 67 and 68 to locate and retain magnet 73. More specifically once rotor lamination assembly 16 is formed, magnets are inserted into the lamination member(s), lamination component(s), lamination element(s) and/or lamination sections. As such, magnet retaining members, magnet retaining components, magnet retaining elements, and or magnet retaining sections are aligned allowing proper positioning of the magnets within rotor lamination assembly 16.

In a manner similar to that described above, a first void 414 is established between magnet 73 and first end section 404, and a second void 415 is formed between second end section 405 and magnet 73. First and second voids 414 and 415 are provided with a corresponding filler material 418 and 419. Filler material 418 and 419 typically takes the form of injected plastic that not only holds magnet 73 in place, but also prevents oil from penetrating into lamination assembly 16. In the exemplary embodiment shown, second end section 405 of magnet receiving section element 380 is spaced from outer diametric edge 362 establishing a bridge portion 425 having a width σ. In accordance with one aspect of the exemplary embodiment, width σ is substantially equal to width μ and is between about 1.5 mm and about 2.5 mm.

Similarly, magnet receiving section 395 includes a first end section 440 that extends to a second end section 441 through an intermediate section 442. A first magnet retaining section 445 is arranged proximate to first end section 440 and a second magnet retaining section 446 is arranged proximate to second end section 441. First and second magnet retaining sections 445 and 446 register with first and second magnet retaining members 89 and 90 to locate and retain magnet 92 within magnet receiving section 395. In a manner similar to that described above, a first void 450 is established between magnet 92 and first end section 440 and a second void 451 is formed between second end section 441 and magnet 92. First and second voids 450 and 451 are provided with a corresponding filler material (not separately labeled). As also noted above, the filler material typically takes the form of injected plastic that holds magnet 92 in place.

In the exemplary embodiment shown, first end section 404 of magnet receiving section 380 is spaced from first end section 440 of magnet receiving section 395 by a bridge zone 460. In the embodiment shown, bridge zone 460 includes a thickness π. In accordance with one aspect of the exemplary embodiment, thickness π is between about 3 mm and about 8 mm. In accordance with another aspect of the exemplary embodiment, thickness π is between about 4 mm and about 6 mm. In accordance with yet another aspect of the exemplary embodiment, thickness π is about 5.5 mm. In a manner similar to that described above, bridge zone 460 is larger than bridge zone 98. In accordance with one aspect of the exemplary embodiment, bridge zone 460 is substantially identical to bridge zones 159 and 260. In accordance with another aspect of the exemplary embodiment, bridge zone 460 is distinct, either larger or smaller than bridge zones 159 and 260. In any event, bridge zones 159, 260, and 460 are larger than bridge zone 98.

With this arrangement, lamination section 26 provides support for lamination member(s) 20 to facilitate high speed operation of electric machine 2 without concern for failure of bridge portion(s) 84. That is, the inclusion of bridge zone 460 having a thickness that is larger than bridge zone 98, enables lamination section 26 to further support adjacent lamination members(s) 20, lamination component(s) 22, and/or lamination element(s) 24 thereby facilitating high speed operation.

At this point it should be understood that the particular placement, arrangement and number of lamination members, lamination components, and lamination elements could vary without departing from the scope of the claims. That is, electric machine 2 could include, in addition to lamination members 20, one or more lamination components, one or more lamination elements and/or one or more lamination sections in order to facilitate high speed operation without sacrificing performance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electric machine comprising:
   a stator; and
   a rotor lamination assembly configured and disposed to rotate relative to the stator; the rotor lamination assembly comprising:
      at least one lamination member including a body member formed from a material having a first yield strength, the body member including an outer diametric edge, a first magnet receiving member and a second magnet receiving member, each of the first and second magnet receiving members including a first end that extends to a second end, the second end of at least one of the first and second magnet receiving members being spaced from the outer diametric edge to form a first bridge portion having a first width, and the first end of the first magnet receiving member being spaced from the first end of the second magnet receiving member by a first bridge zone having a first thickness;
      at least one lamination section distinct from the at least one lamination member, the at least one lamination section including a body section having a first magnet receiving section and a second magnet receiving section, each of the first and second magnet receiving sections including a first end section that extends to a second end section, the first end section of the first magnet receiving section being spaced from the first end section of the second magnet receiving section by a second bridge zone having a second thickness, the second thickness being greater than the first thickness;
      at least one lamination element distinct from the at least one lamination member, and the at least one lamination section, the at least one lamination element including a body element formed from a second material having a second yield strength that is higher than the first yield strength; and
      at least one lamination component distinct from the at least one lamination member, the at least one lamination section and the at least one lamination element, the at least one lamination component including a body component having an outer diametric edge, and at least one magnet receiving component, the at least one magnet receiving component including a first end portion that extends to a second end portion, the second end portion being spaced from the outer diametric edge to form a second bridge portion having a second width, the second width being greater than the first width.

2. The electric machine according to claim 1, wherein the at least one lamination element includes a first magnet receiving element having a first end that extends to a second end, and second magnet receiving element adjacent the first magnet receiving element, the second magnet receiving element having a first end that extends to a second end, the first end of the first magnet receiving element being spaced from the first end of the second magnet receiving element by a third bridge zone having a third thickness, the third thickness being greater than the first thickness.

3. The electric machine according to claim 2, wherein the at least one magnet receiving component includes a first magnet receiving component having a first end portion that extends to a second end portion, and second magnet receiving component adjacent the first magnet receiving component, the second magnet receiving component having a first end portion that extends to a second end portion, the first end portion of the first magnet receiving component being spaced from the first end portion of the second magnet receiving component by a fourth bridge zone having a fourth thickness, the fourth thickness being greater than the first thickness.

4. The electric machine according to claim 3, wherein the second thickness is distinct from the third thickness and the third thickness is distinct from the fourth thickness.

5. An electric machine comprising:
   a stator; and
   a rotor lamination assembly configured and disposed to rotate relative to the stator; the rotor lamination assembly comprising:
      at least one lamination member including a body member formed from a material having a first yield strength, the body member including an outer diametric edge, a first magnet receiving member and a second magnet receiving member, wherein the first magnet receiving member includes a first end that extends to a second end, and the second magnet receiving member includes a first end that extends to a second end, the first end of the first magnet receiving member being spaced from the first end of the second magnet receiving member by a first bridge zone having a first thickness; and
      at least one lamination element distinct from the at least one lamination member, the at least one lamination element including a body element formed from a second material having a second yield strength that is higher than the first yield strength, wherein the at least one lamination element includes a first magnet receiving element having a first end that extends to a second end, and second magnet receiving element adjacent the first magnet receiving element, the second magnet receiving element having a first end that extends to a second end, the first end of the first magnet receiving element being spaced from the first end of the second magnet receiving element by a second bridge zone, separating the first magnet receiving element from the second magnet receiving element, having a second thickness, the second thickness being greater than the first thickness, the first magnet receiving element being aligned with the first magnet receiving member, the first magnet receiving element and the first magnet receiving member being configured to receive a first magnet, and the second magnet receiving element being aligned with the second magnet receiving member, the second magnet receiving element and the second magnet receiving member being and configured to receive a second magnet, wherein each of the first and second magnet receiving elements and first and second magnet receiving members includes a void positioned at the end portions of the first and second magnets.

6. The electric machine according to claim 5, wherein the at least one lamination element is formed from a non-magnetic material.

7. The electric machine according to claim 6, wherein the at least one lamination element is formed from one of stainless steel, glass fiber, and ceramic.

8. The electric machine according to claim 5, wherein the at least one lamination element is formed from a high carbon steel.

9. The electric machine according to claim 5, wherein the second yield strength is at least about 30% higher than the first yield strength.

10. The electric machine according to claim 5, wherein the first magnet receiving member includes a first end that extends to a second end, the second end being spaced from the outer diametric edge to form a first bridge portion having a first width.

11. The electric machine according to claim 10, wherein the body element includes an outer diametric edge, and at least one magnet receiving element, the at least one magnet receiving element including a first end that extends to a second end, the second end being spaced from the outer diametric edge to form a second bridge portion having one of the first width and a second width, the second width being greater than the first width.

12. The electric machine according to claim 11, wherein the second bridge portion is formed having the second width.

13. The electric machine according to claim 5, wherein the second thickness of the second bridge zone is between about 3 mm and about 8 mm.

14. An electric machine comprising:
a stator; and
a rotor lamination assembly configured and disposed to rotate relative to the stator; the rotor lamination assembly comprising:
at least one lamination member including a body member having an outer diametric edge, a first magnet receiving member and a second magnet receiving member, each of the first and second magnet receiving members including a first end that extends to a second end, the second end of at least one of the first and second magnet receiving members being spaced from the outer diametric edge to form a first bridge portion having a first width; and
at least one lamination component distinct from the at least one lamination member, the at least one lamination component including a body component having an outer diametric edge, and at least one magnet receiving component, the at least one magnet receiving component including a first end portion that extends to a second end portion, the second end portion being spaced from the outer diametric edge to form a second bridge portion having a second width, the second width being greater than the first width, the at least one magnet receiving component being aligned with one of the first and second magnet receiving members, the at least one magnet receiving component configured to receive a magnet and the one of the first and second magnet receiving members being configured to receive a the magnet.

15. The electric machine according to claim 14, wherein the body component is formed from a second material having a second yield strength that is higher than the first yield strength.

16. The electric machine according to claim 14, wherein at least one first and second magnet receiving member includes first and second magnet retaining members configured and disposed to position a magnet in the rotor lamination assembly.

17. The electric machine according to claim 16, wherein the at least one magnet receiving component includes first and second magnet retaining components configured and disposed to position the magnet in the rotor lamination assembly, the first and second magnet retaining components registering with the first and second magnet retaining members in the rotor lamination assembly.

18. The electric machine according to claim 14, wherein the first end of the first magnet receiving member is spaced from the first end of the second magnet receiving member by a first bridge zone having a first thickness.

19. The electric machine according to claim 18, wherein the at least one magnet receiving component includes a first magnet receiving component having a first end portion that extends to a second end portion, and second magnet receiving component positioned adjacent the first magnet receiving component, the second magnet receiving component having a first end portion that extends to a second end portion, the first end portion of the first magnet receiving component being spaced from the first end portion of the second magnet receiving component by a second bridge zone having a second thickness, the second thickness being greater than the first thickness.

20. The electric machine according to claim 19, wherein the second thickness of the second bridge zone is between about 3 mm and about 8 mm.

21. An electric machine comprising:
a stator; and
a rotor lamination assembly configured and disposed to rotate relative to the stator; the rotor lamination assembly comprising:
at least one lamination member including a body member formed from a material having a first yield strength, the body member including an outer diametric edge, a first magnet receiving member and a second magnet receiving member, each of the first and second magnet receiving members including a first end that extends to a second end, the first end of the first magnet receiving member being spaced from the first end of the second magnet receiving member by a first bridge zone having a first thickness; and
at least one lamination section distinct from the at least one lamination member, the at least one lamination section including a body section having a first magnet receiving section and a second magnet receiving section, each of the first and second magnet receiving sections including a first end section that extends to a second end section, the first end section of the first magnet receiving section being spaced from the first end section of the second magnet receiving section by a second bridge zone, separating the first magnet receiving section from the second magnet receiving section, having a second thickness, the second thickness being greater than the first thickness, the first magnet receiving section being aligned with the first magnet receiving member, the first magnet receiving section and the first magnet receiving member being and configured to receive a first magnet, and the second magnet receiving section being aligned with the second magnet receiving member, the second magnet receiving section and the second magnet receiving member being configured to receive a second magnet.

22. The electric machine according to claim 21 wherein the first thickness is between about 1 mm and about 2 mm.

23. The electric machine according to claim 21 wherein the second thickness is between about 3 mm and about 8 mm.

24. The electric machine according to claim 21, wherein the second thickness is between about 4 mm and about 6 mm.

25. The electric machine according to claim 21, wherein the second thickness is about 5.5 mm.

* * * * *